United States Patent [19]

Farino

[11] Patent Number: 5,644,937
[45] Date of Patent: Jul. 8, 1997

[54] VEHICLE THEFT PREVENTION DEVICE

[76] Inventor: Joseph Farino, 302-310 Broadway, Passaic, N.J. 07055

[21] Appl. No.: 640,150

[22] Filed: Apr. 30, 1996

[51] Int. Cl.[6] ............................. A47C 31/00; E05B 65/44
[52] U.S. Cl. .................. 70/261; 180/287; 296/65.1; 70/237; 70/238
[58] Field of Search ............................. 70/261, 237, 238, 70/203, 212, 209; 180/287; 296/65.1, 69; 292/338

[56] References Cited

U.S. PATENT DOCUMENTS

| | | | |
|---|---|---|---|
| 1,307,354 | 6/1919 | Goode | 70/203 |
| 1,312,204 | 8/1919 | Price | 70/237 |
| 1,423,955 | 7/1922 | Miller | 70/203 |
| 1,505,184 | 8/1924 | Zukor | 292/338 |
| 3,245,239 | 4/1966 | Zaidener | 70/237 |
| 3,650,347 | 3/1972 | Campos | 296/65.1 |
| 4,116,297 | 9/1978 | Ross et al. | 70/237 |
| 4,176,870 | 12/1979 | Cracraft | 292/338 |
| 4,747,279 | 5/1988 | Solow | 70/238 |
| 4,835,999 | 6/1989 | Chant | 70/238 |
| 5,181,404 | 1/1993 | Baker | 70/237 |
| 5,213,388 | 5/1993 | Baker | 70/261 |
| 5,251,465 | 10/1993 | Hwang | 70/209 |
| 5,345,796 | 9/1994 | Chieh et al. | 70/237 |
| 5,412,964 | 5/1995 | Yee | 70/237 |

FOREIGN PATENT DOCUMENTS

| | | | |
|---|---|---|---|
| 204817 | 10/1920 | Canada | 70/212 |
| 2735782 | 11/1978 | Germany | 70/238 |
| 2908611 | 10/1988 | Germany | 70/261 |
| 143132 | 5/1920 | United Kingdom | 70/212 |
| 997868 | 7/1965 | United Kingdom | 70/203 |
| 2102363 | 2/1983 | United Kingdom | 70/261 |
| 9009911 | 9/1990 | WIPO | 70/238 |

*Primary Examiner*—Darnell M. Boucher
*Attorney, Agent, or Firm*—Arnold D. Litt, Esq.

[57] ABSTRACT

A theft prevention device for vehicles including a vehicle body upon which a vehicle seat is mounted, wherein the vehicle seat includes a seat member and a lumbar support member. The theft prevention device includes an extension member having a first end adapted for attachment to the body of a vehicle and a second end adapted for attachment to the vehicle seat. The extension member is extendable between a first compact length and a second extended length. The theft prevention device is further provided with a locking member coupled to the extension member for selectively locking the extension member at desired lengths. In use, the extension member locks the seat in a forward position preventing a thief from accessing the passenger compartment of the vehicle. The invention also provides a vehicle having a theft prevention device. The vehicle includes a vehicle seat moveable between a first rearward position and a second forward position. The first rearward position provides space for a driver to sit within the seat and drive the vehicle and the second forward position places the vehicle seat forward within the passenger compartment of the vehicle limiting access to components associated with a front instrument panel and dashboard of the vehicle. The vehicle is also provided with a mechanism for selectively locking the vehicle seat in the second forward position to prevent a thief from accessing the passenger compartment of the vehicle.

25 Claims, 10 Drawing Sheets

VEHICLE THEFT PREVENTION DEVICE

BACKGROUND OF THE INVENTION

1. Field of the Invention

The invention relates to a vehicle theft prevention device. More particularly, the invention relates a vehicle theft prevention device which locks the vehicle seat, and/or the rear lumbar support member, in a forward position to prevent access to the seating area by a would-be thief. As a result, the would-be thief is denied access to the front instrument panel and dashboard, and is not able to drive the car, open the glove compartment, remove the stereo, or steal other objects which might interest the thief.

2. Background of the Invention

Car theft has become a major problem throughout the United States, and many products have been developed to prevent and deter would-be thieves from stealing automobiles and the goods stored therein.

The vast majority of products are releasably secured to the control functions of the automobile when the owner leaves the automobile, and are intended to prevent a thief from using the car in a conventional manner. For example, bars may be secured to the steering wheel in a manner preventing a thief from properly steering. Similarly, a rod may be positioned between the steering wheel and the brake pedal, or acceleration pedal, to prevent a thief from properly stopping, steering, or accelerating the vehicle. Devices are also known that may be secured to the gear shift to prevent a thief from shifting the automobile out of "Park".

While prior devices are generally effective in preventing a thief from operating the automobile once he or she has entered the vehicle, they often fail to provide the deterrent necessary to discourage the thief from damaging the automobile when he or she attempts to enter the automobile. That is, these products do not sufficiently signal the thief that any attempt to steal the automobile will be futile. As such, thieves often break windows and destroy car locks, only to find they cannot operate the automobile due to the theft prevention device. However, these devices do not limit the thieves' access to the seating area and a thief is, therefore, provided with a work space in which he or she may steal objects stored within or on the front instrument panel and dashboard.

In addition, these products fail to prevent a thief from stealing goods stored within the automobile, for example, air bags, a stereo system or any goods stored within the glove box. Since they are merely secured to the functional components of the automobile, the prior theft prevention devices leave the passenger compartment fully open. As a result, a thief is provided with full access to sit in the seat of the passenger compartment where he or she may steal air bags, stereo equipment, or goods stored in the glove box, despite the fact that the automobile cannot be stolen. The term "passenger compartment" is used throughout the remainder of this disclosure and should be understood to refer to the space between the front instrument panel and dashboard and the front seats of the vehicle. As such, the "passenger compartment" includes, but is not limited to, the seating area, the driver seat, the passenger seat, leg space, the glove compartment, the stereo console and the steering column.

More sophisticated theft prevention devices are also known in the prior art. These devices are commonly based upon complex electronic control systems. Devices of this type generally prevent unauthorized use of the automobile by disabling the car during ignition or after the thief has driven the automobile for a short time. In addition, these devices may also send a warning signal so the automobile owner can locate the stolen vehicle. As with the theft prevention devices discussed above, these electronic devices fail to provide the deterrent necessary to prevent a thief from attempting to steal the automobile. They also leave the passenger compartment open, providing the thief with access to the air bags, stereo equipment and other goods stored in the passenger compartment. Electronic theft prevention devices are also expensive and are often difficult to incorporate into previously existing automobiles. As with prior mechanical theft prevention devices, electronic theft prevention devices do not limit a would-be thief's access to the passenger compartment of the automobile. The thief is, therefore, provided with a work area in which he or she is provided full access to the front instrument panel and dashboard of the vehicle.

As a review of the prior art reveals, a need continues to exist for a cost effective theft prevention device which prevents theft of the automobile, substantially limits access to the passenger compartment of the automobile, and provides a visible deterrent to theft. The present invention provides such a device.

SUMMARY OF THE INVENTION

It is, therefore, an object of the present invention to provide a theft prevention device for vehicles, including a vehicle body upon which a vehicle seat is mounted, wherein the vehicle seat includes a seat member and a lumbar support member. The theft prevention device includes an extension member having a first end adapted for attachment to the body of a vehicle and a second end adapted for attachment to the vehicle seat. The extension bar member is extendable between a first compact length and a second extended length. The theft prevention device is further provided with a locking member coupled to the extension member for selectively locking the extension bar member at desired lengths. In use, the extension member is locked at a desired length in a manner preventing a thief from accessing the passenger compartment of the vehicle.

It is also an object of the present invention to provide a theft prevention device wherein the extension member includes a first bar coupled to a second bar in a manner permitting the first bar and the second bar to move relative to each other.

It is another object of the present invention to provide a theft prevention device wherein the first bar is telescopically coupled to the second bar.

It is a further object of the present invention to provide a theft prevention device wherein the second bar is telescopically received within the first bar.

It is also an object of the present invention to provide a theft prevention device wherein the first bar is U-shaped, thereby, creating a recess in which the second bar moves.

It is another object of the present invention to provide a theft prevention device wherein the locking member is mounted on the first bar and selectively engages the second bar to lock the second bar relative to the first bar.

It is a further object of the present invention to provide a theft prevention device which substantially limits access to the passenger compartment of a vehicle, and, thereby, prevents a thief from entering the passenger compartment.

It is a further object of the present invention to provide a vehicle having a theft prevention device. The vehicle includes a vehicle seat moveable between a first rearward position and a second forward position. The first rearward position provides space for a driver to sit within the seat and drive the vehicle and the second forward position places the vehicle seat forward within the passenger compartment of the vehicle limiting access to components associated with the front instrument panel and dashboard of the vehicle. The vehicle is also provided with means associated with the vehicle seat for selectively locking the vehicle seat in the second forward position to prevent a thief from accessing the passenger compartment of the vehicle.

It is also an object of the present invention to provide a vehicle wherein the means for locking includes an extension member positioned between the vehicle seat and a frame member of the vehicle.

It is another object of the present invention to provide a vehicle wherein the extension member includes a first bar secured to the frame member and a second bar secured to the vehicle seat.

It is a further object of the present invention to provide a vehicle wherein the extension member includes a locking member selectively locking the first bar relative to the second bar.

It is also an object of the present invention to provide a vehicle wherein the first bar is secured to a pivoting bolt of a rocker panel of the vehicle.

It is another object of the present invention to provide a vehicle wherein the second bar is secured to a lumbar support member of the vehicle seat.

It is a further object of the present invention to provide a vehicle wherein the means for locking includes a locking member.

Other objects, advantages and salient features of the invention will become apparent from the following detailed description, which taken in conjunction with the annexed drawings, discloses a preferred, but non-limiting, embodiment of the subject invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
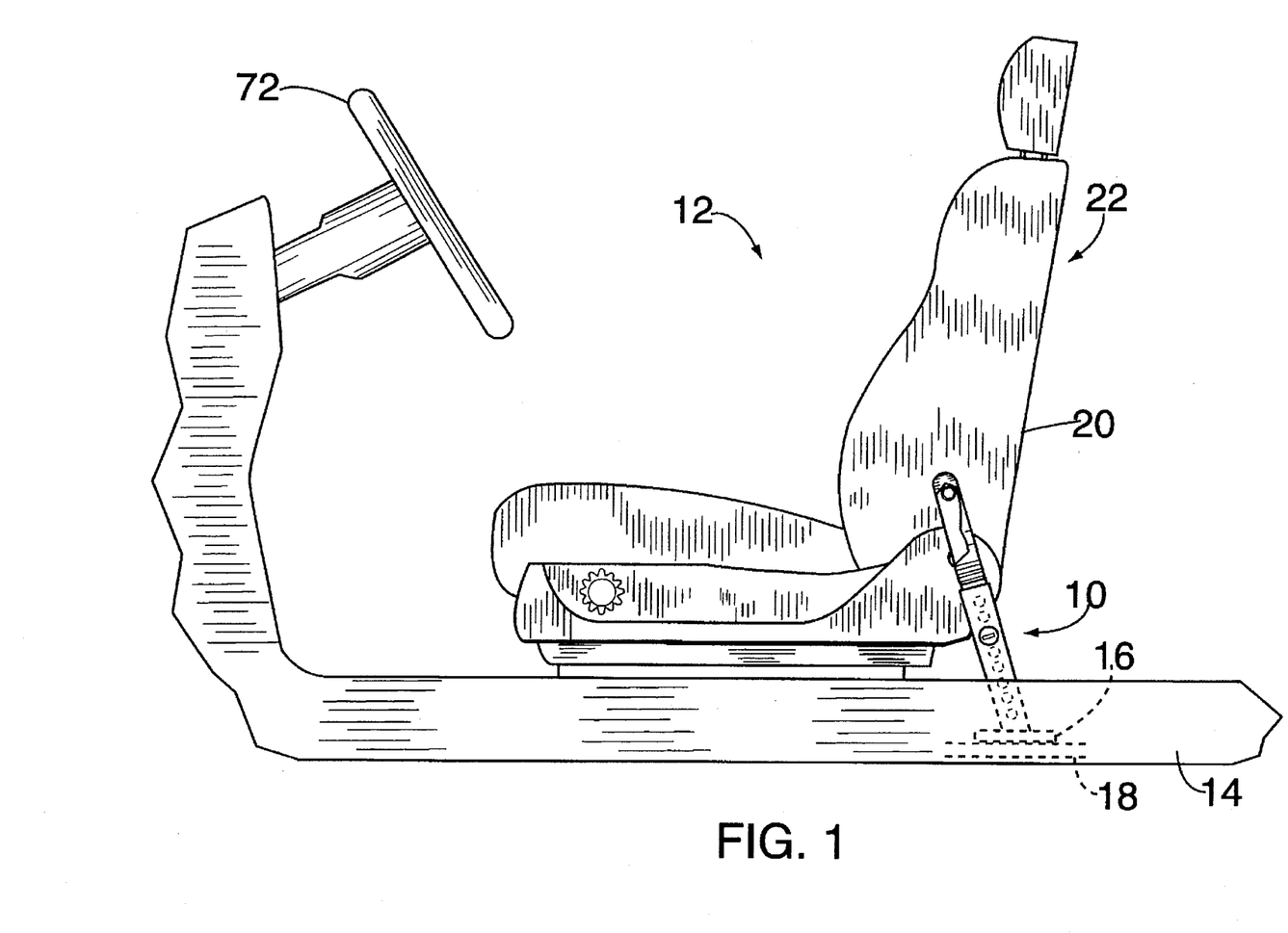
FIG. 1 is a side view of an vehicle seat including a first embodiment of the present theft prevention seat.

With reference to FIG. 1, the present theft prevention device 10 is shown mounted within a vehicle 12. The term "vehicle" is used throughout this disclosure and is intended to include cars, automobiles, trucks and other transportation devices that may incorporate the present invention in a useful manner. The theft prevention device 10 is mounted between the vehicle frame 14, specifically, the pivoting bolt 16 of the rocker panel 18, and the lumbar support member 20 of the vehicle seat 22. While the vehicle seat discussed below is provided with a lumbar support member that is freely pivoted relative to the seat member, the theft prevention device may be utilized with virtually any vehicle seat regardless of the lumbar support member's ability to pivot relative to the seat member. In fact, the theft prevention device is designed such that it may be used with virtually any vehicle, without departing from the spirit of the present invention.

Figure 2:
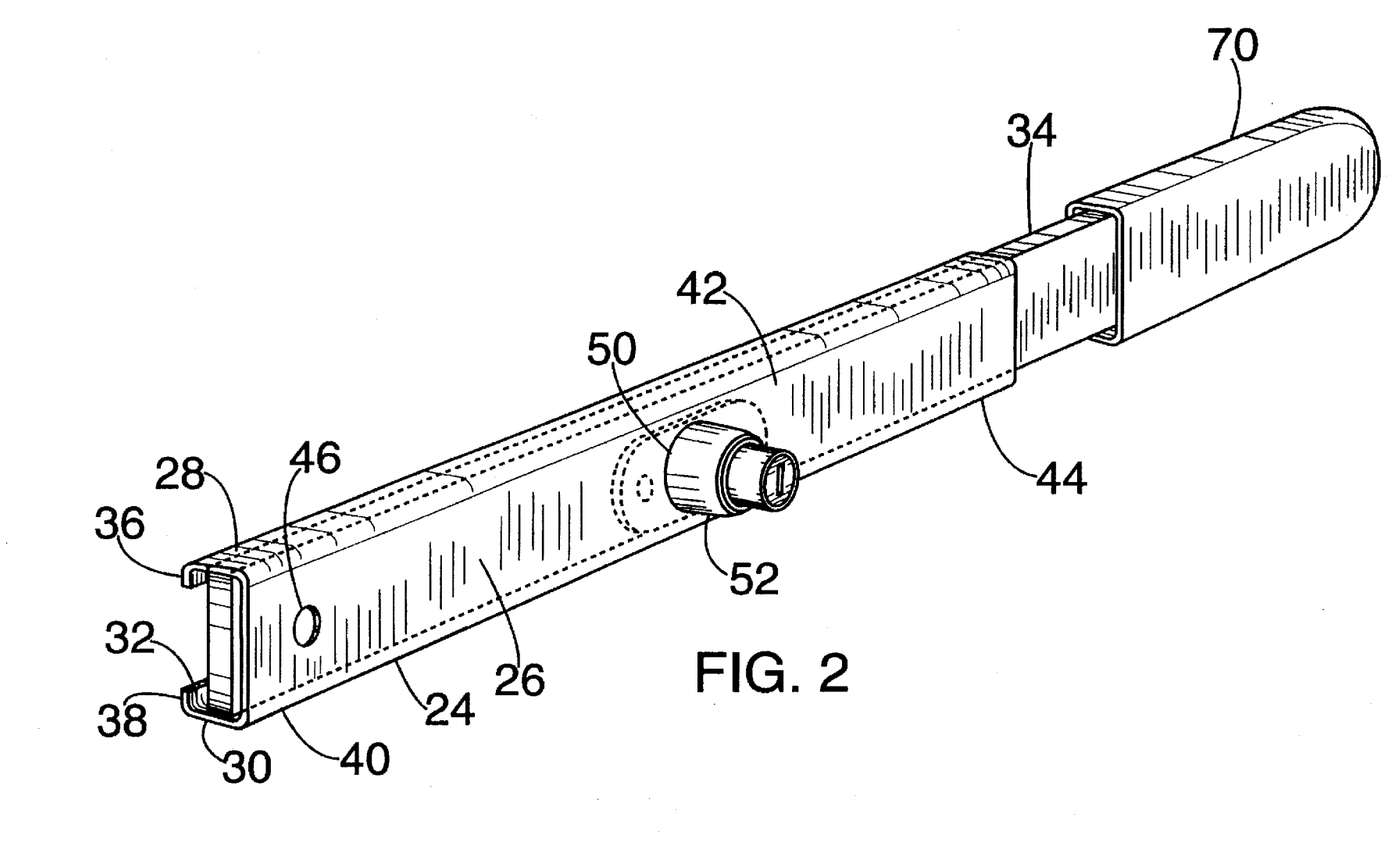
FIG. 2 is a perspective view of the present theft prevention device.
Figure 3:
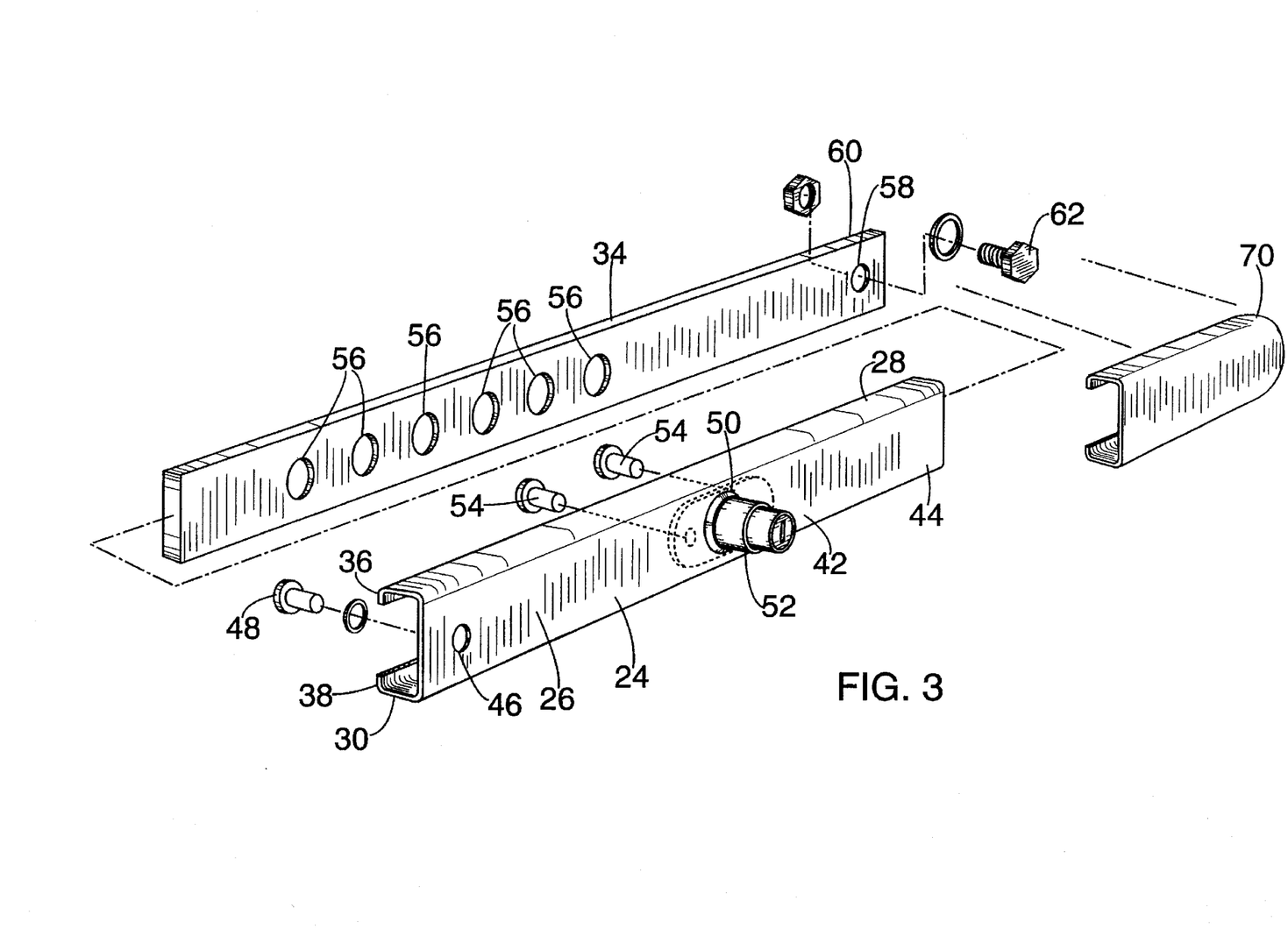
FIG. 3 is an exploded view of the present theft prevention device.

The theft prevention device 10 itself is shown in greater detail in FIGS. 2 and 3. The device 10 includes a first U-shaped bar 24 adapted for attachment to the pivoting bolt 16 of the vehicle's rocker panel 18. The U-shaped bar 24 includes a flat central member 26 having a first arm 28 and a second arm 30 extending therefrom to create a recess 32 in which the second bar 34 may travel. The first arm 28 includes a distal end 36 that is curved inwardly toward the open end of the U-shaped bar 24 and the second arm 36 includes a distal end 38 that is similarly curved inwardly toward the open end of the U-shaped bar 24. The curved distal end 36 of the first arm 28 and the curved distal end 38 of the second arm 30 extend inward a sufficient distance to maintain the second bar 34 within the recess 32. The recess 32 is sized to maintain the second arm 30 therein, but permit the second arm 30 to freely slide within the recess 32. As a result, the recess 32 is designed to be only slightly larger than the second arm 30.

Figure 9:
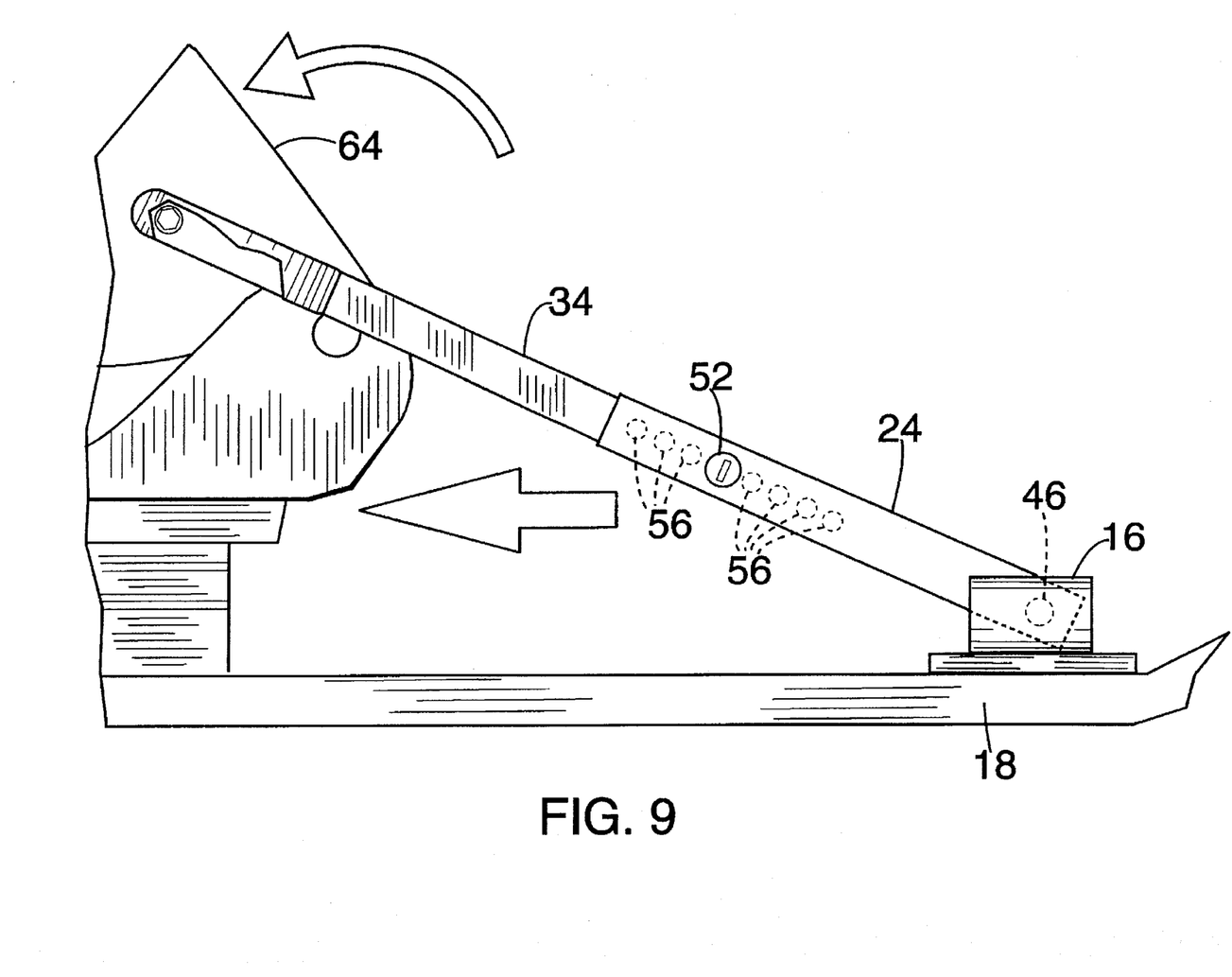
FIG. 9 is a side view showing the attachment of the theft prevention device to the pivoting bolt of the rocker panel.

The central member 26 includes a first end 40, a central portion 42 and a second end 44. The first end 40 is provided with a hole 46 sized to permit a bolt 48 to pivotally secure the first end 40 of the U-shaped bar 24 to the pivoting bolt 16 of the vehicle's rocker panel 18 (see FIG. 9). In this way the U-shaped bar 24 may pivot in a manner that will become apparent as the device is further explained.

The central member 26 is also provided with an opening 50 at its central portion 42 for supporting a locking member 52 thereon. The locking member 52 is secured to the U-shaped bar by a pair of bolts 54. The locking member 52 is positioned on the U-shaped bar 24 such that it may selectively engage openings 56 on the second bar 34 to lock the second bar 34 relative to the U-shaped bar 24 in a manner that will be discussed in greater detail below.

Figures 11A, 11B:
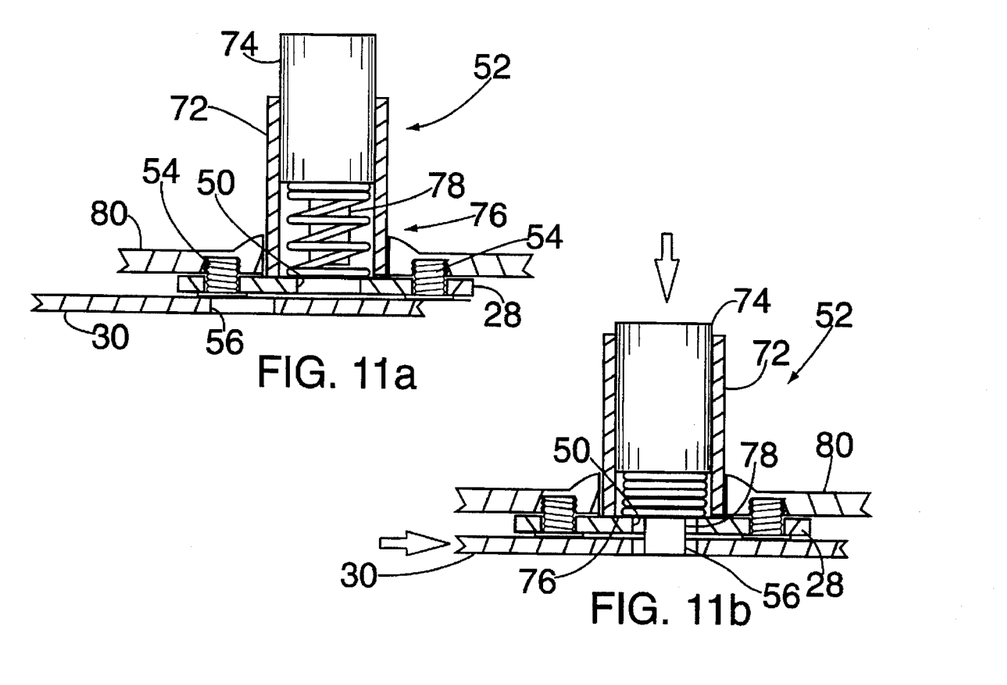
FIG. 11a is a cross-sectional view of the locking member in its unlocked position.
FIG. 11b is a cross-sectional view of the locking member in its locked position.

As shown in FIGS. 11a and 11b, the locking member 52 is a conventional spring lock. The locking member 52 is provided with a sleeve 72 in which a locking cylinder 74 is positioned. The locking cylinder 74 is resiliently biased by a spring 76 such that a projecting member 78 is forced away from opening 50. When an individual wishes to move the projecting member 78 such that it is positioned within opening 50 of the first arm 28 and any of the openings 56 on the second arm 30, the user pushes downwardly on the locking cylinder 74, against the force of the spring 76. Once the projecting member 78 is positioned within opening 50 and 56, a key is inserted within the locking cylinder and rotated to lock the locking cylinder 74 at its position within the sleeve 72. This locks the first arm 28 relative to the second arm 30. The security provided by the locking member 52 is enhanced by the provision of a flange 80 secured to the sleeve 72. The flange 80 accepts bolts 54 to securely mount the locking member 52 on the first arm 28. The provision of the flange 80 prevents thieves from prying the locking member 52 off the first arm 52. While the disclosed locking member 52 utilizes a key for actuation, the locking member could be electronically actuated. For example, the locking member 52 could be controlled via the use of a remote control, which will cause a solenoid to retract or extend a locking pin.

The second bar 34 is shaped to be telescopically received within the recess formed in the U-shaped member 24. The second bar 34 includes a plurality of holes 56 along its length. The holes 56 are positioned such that the locking member 52 selectively engages the openings 56 to lock the second bar 34 relative to the U-shaped bar 24.

Figure 10:
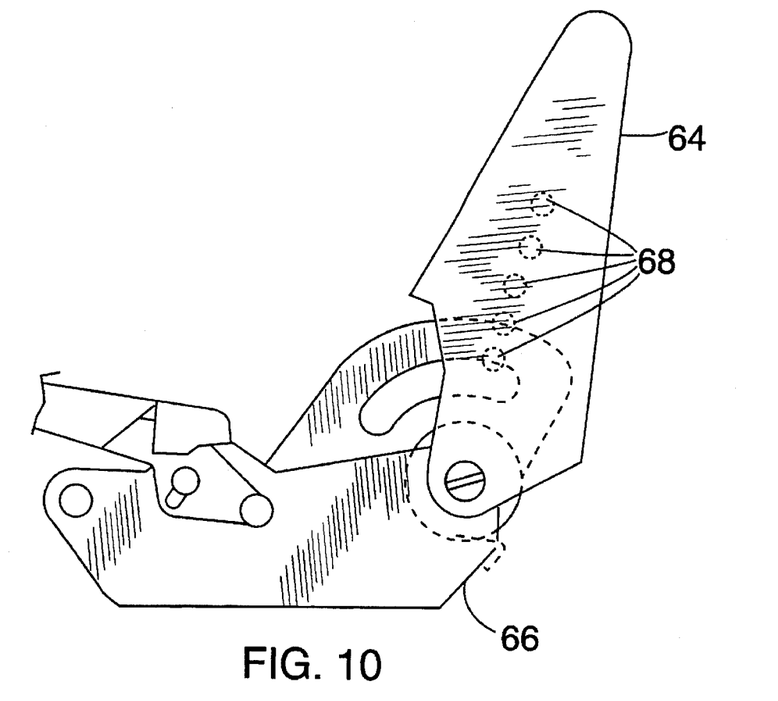
FIG. 10 is a side view showing the internal details of the vehicle seat.

The second bar 34 is also provided with an opening 58 at its first end 60. The opening 58 is shaped to accept a bolt 62 for pivotally securing the first end 60 of the second bar 34 to the lumbar support member 20. Specifically, the second bar 34 is bolted to the lumbar hinge support arm 64, which is shown in FIG. 10. Specifically, vehicle seats 22 are commonly provided with a lumbar hinge support arm 64 pivotally secured to the seat frame member 66. The lumbar hinge support arm 64 includes a plurality of holes 68 to which the first end of the second bar may be bolted. The first end 60 of the second bar 34 is bolted to the lumbar hinge support arm 64 in a manner permitting the second bar 34 to freely pivot relative the lumbar hinge support arm 34. As shown in FIGS. 2 and 3, a cover 70 is also provided for positioning over the first end 60 of the second bar 34. The cover 70 is made from any durable material, preferably plastic, and is designed to provide a more aesthetically pleasing device by covering the bolt and the first end of the second member.

Figure 4:
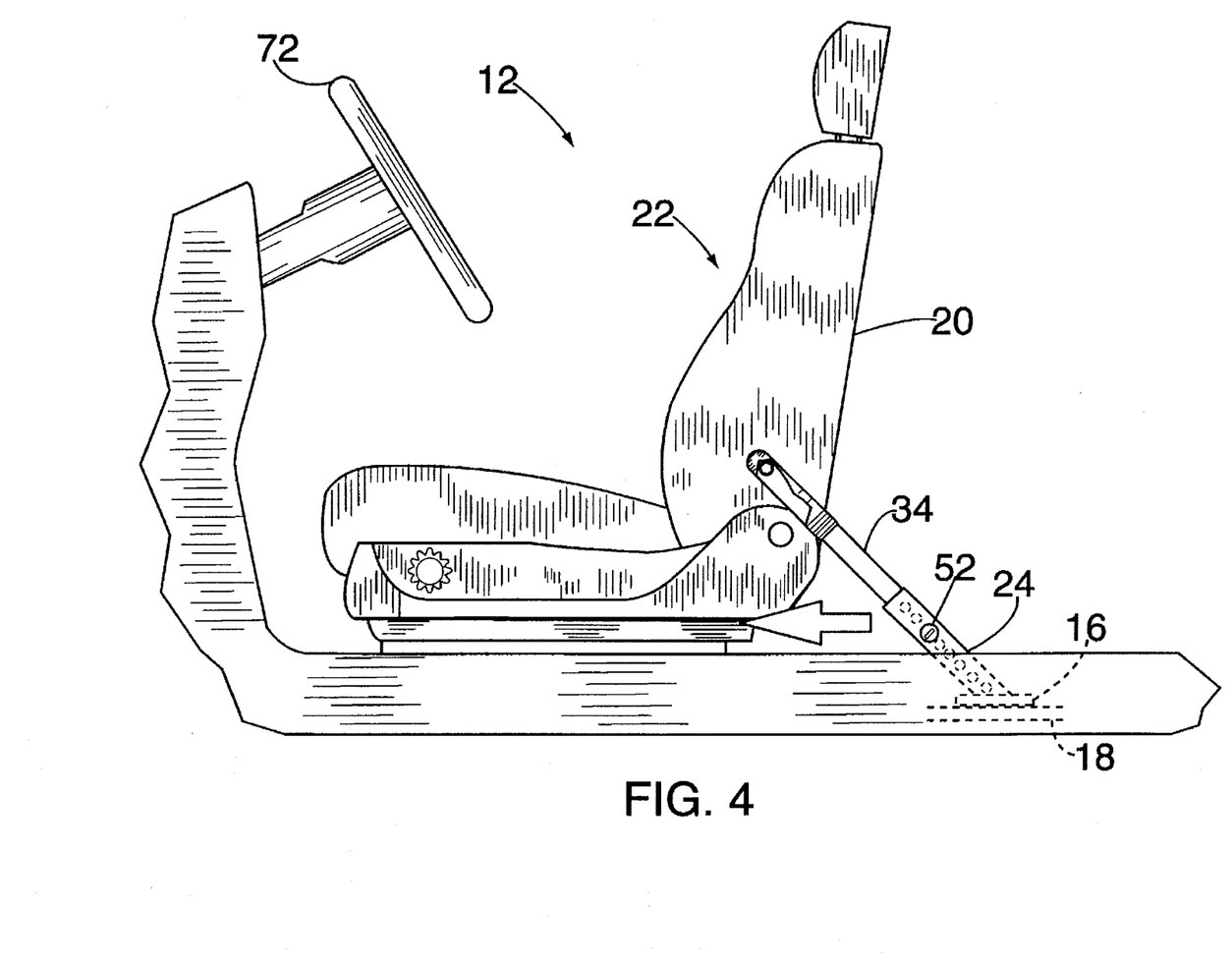
FIG. 4 is a side view of the first embodiment of the present theft prevention device showing the device as the seat moves forward.
Figure 5:
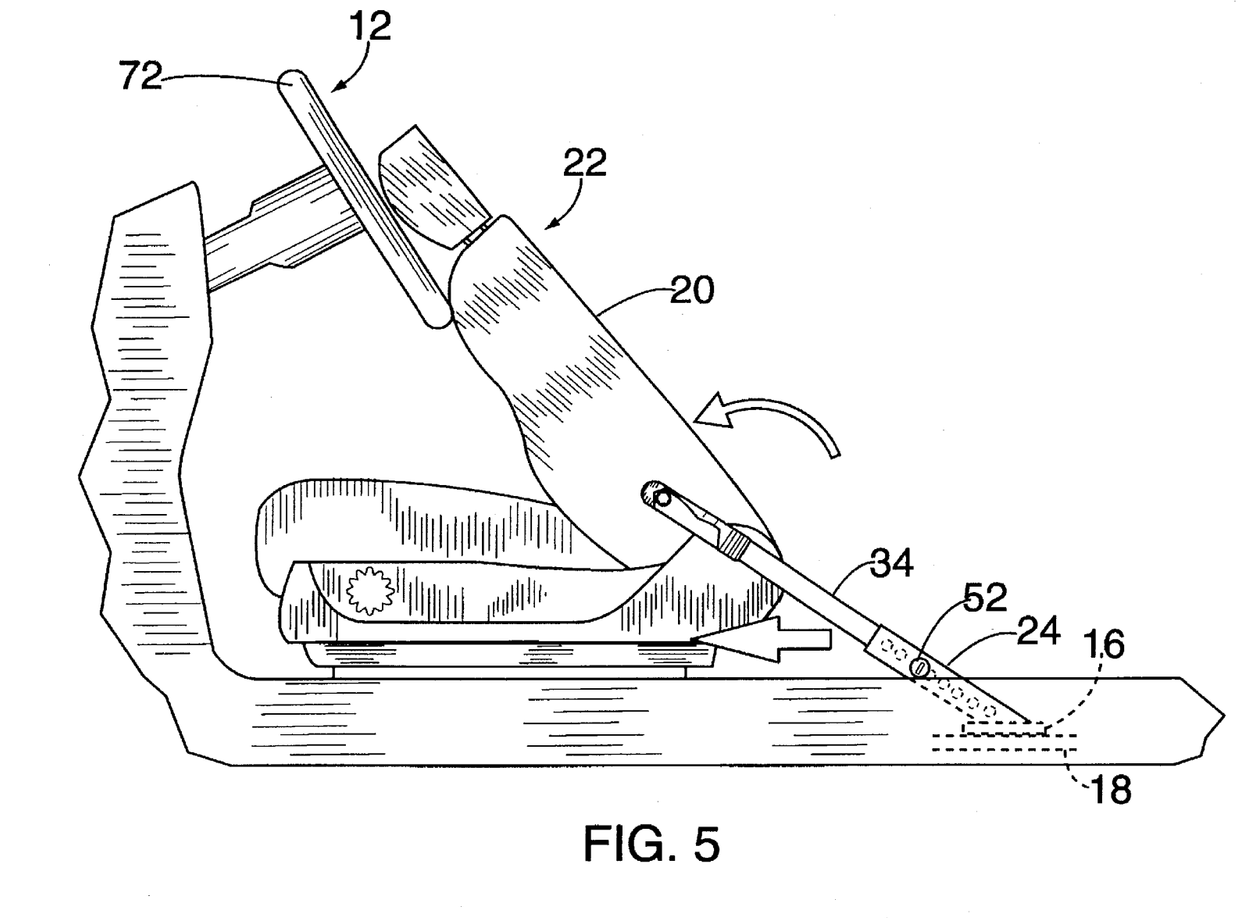
FIG. 5 is a side view of the first embodiment of the present theft prevention device showing the device when the seat and lumbar support are fully moved forward.

Referring to FIGS. 1, 4, and 5, the use of the present theft prevention device 10 is disclosed. In use, the extension member (i.e., the U-shaped bar 24 and the second bar 34) is secured to the pivoting bolt of the vehicle's rocker panel and the lumbar support member in the manner described above. When a vehicle owner wishes to drive the vehicle 12, the seat 22 is positioned in a desirable manner and the locking member 52 is not positioned to engage the second bar 34. After a vehicle owner reaches a desired location and wishes to secure his or her vehicle, the seat 22 is moved forward as far as possible. Similarly, the lumbar support member 20 is rotated forward until it contacts the steering wheel 72 (when the driver's seat is secured) or the front instrument panel and dashboard of the passenger compartment (when the front passenger seat is secured). Once the vehicle seat 22 is fully moved forward to limit access to the passenger compartment (see FIG. 5), the locking member 52 is actuated to lock the second bar 34 relative to the U-shaped bar 24. This is accomplished by moving the projection 78 of the locking member 72 within openings 50 and 56 and locking the locking cylinder 76 in its position with the sleeve 72. At this point, the vehicle seat 22 is locked in position and may not be moved until the owner releases the locking member 52 permitting the second bar 34 to move relative to the first U-shaped bar 24.

Figure 6:
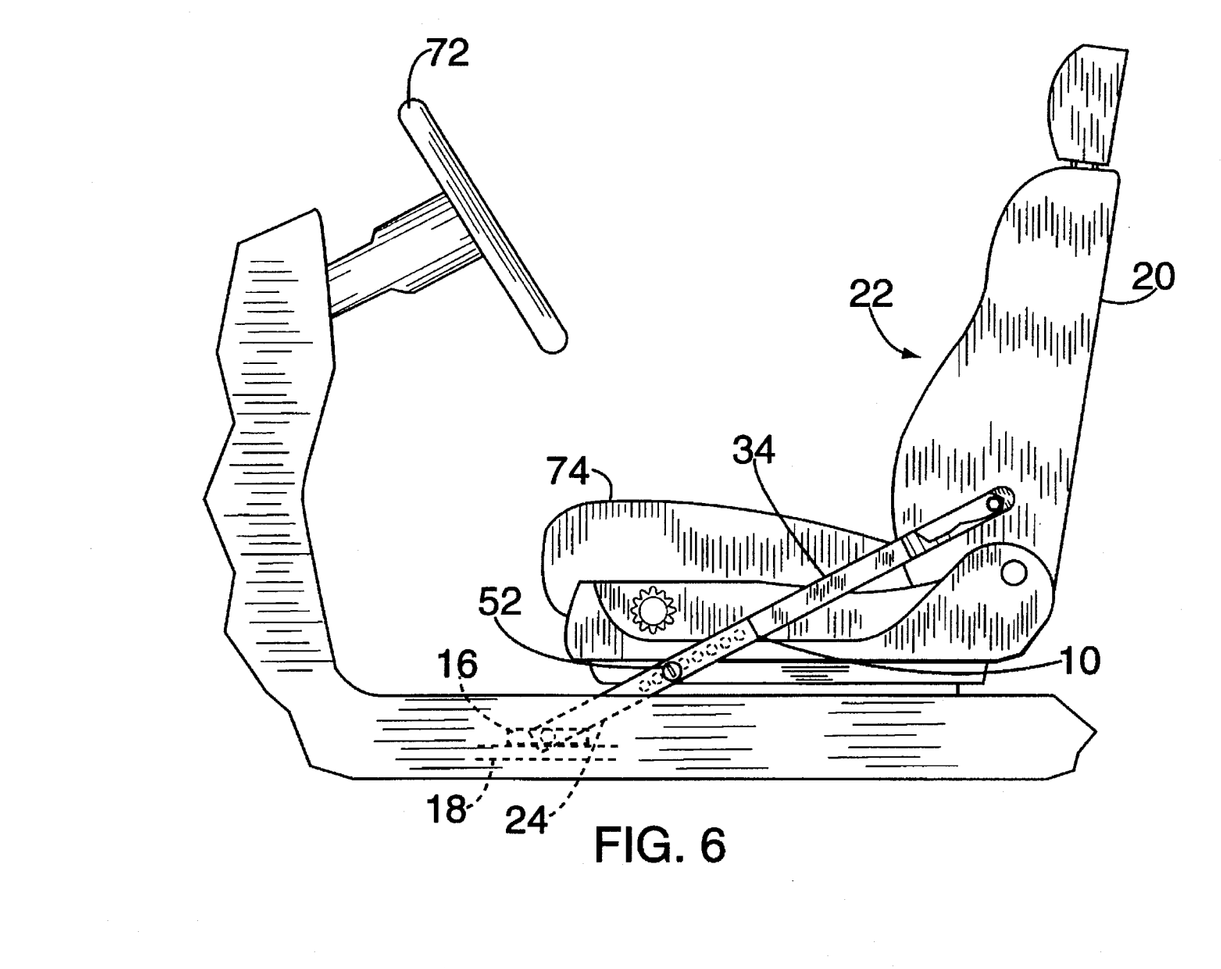
FIG. 6 is a side view of a vehicle seat including a second embodiment of the present theft prevention device attached to the seat.
Figure 7:
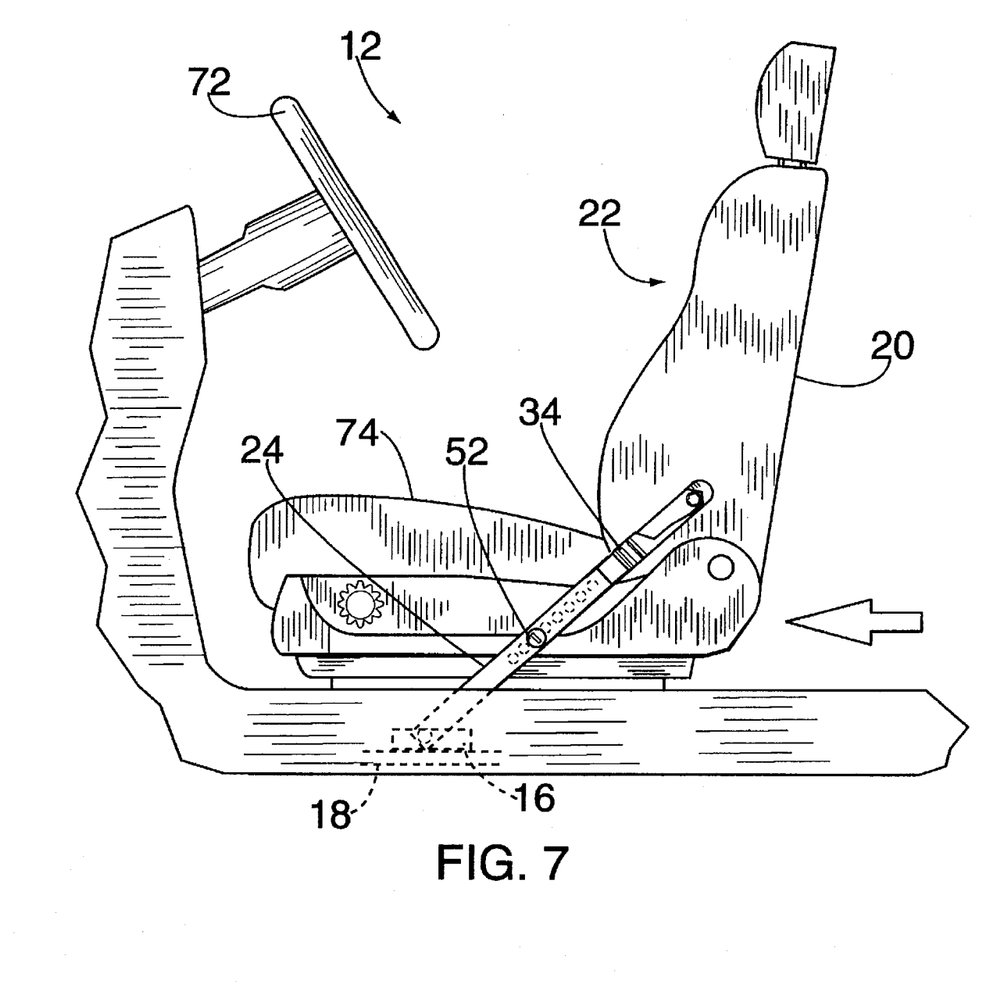
FIG. 7 is a side view of the second embodiment of the present theft prevention device showing the device as the seat moves forward.
Figure 8:
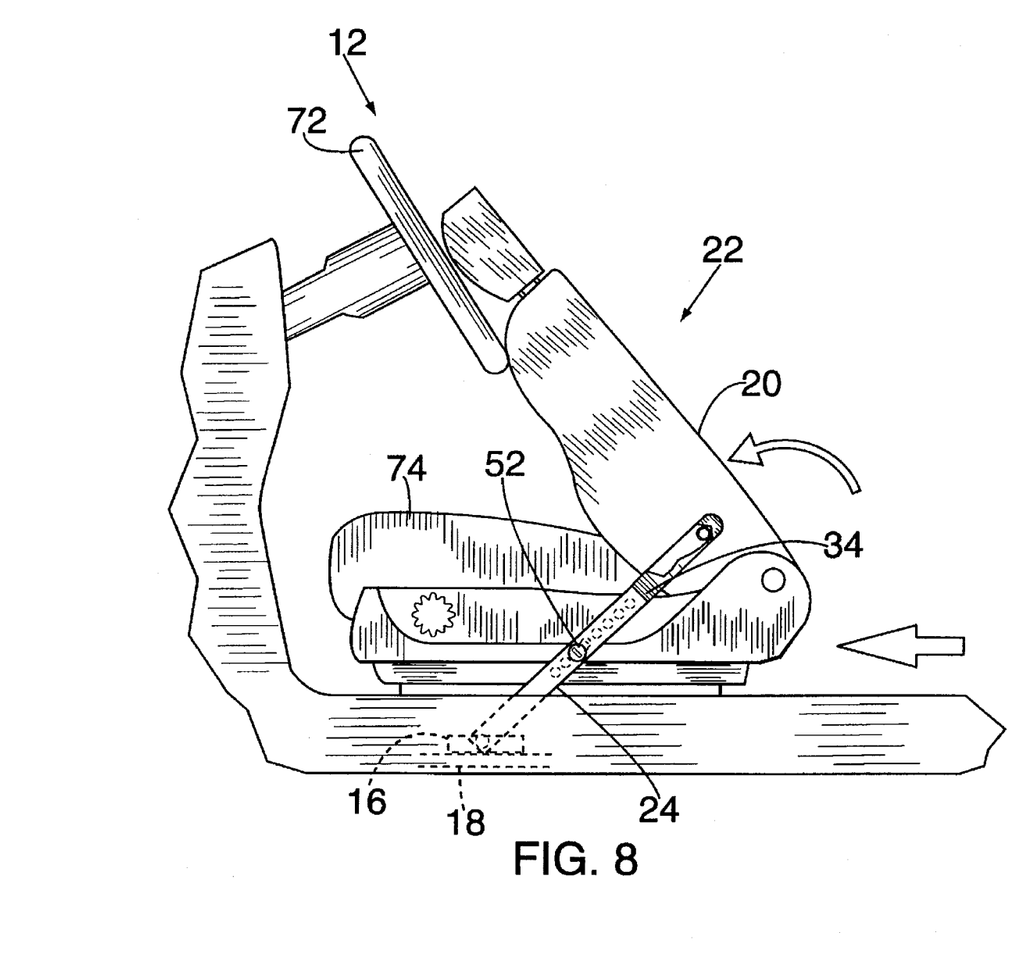
FIG. 8 is a side view of the second embodiment of the present theft prevention device showing the device when the seat and the lumbar support are fully moved forward.

The use of the theft prevention device 10 as disclosed in FIG. 1, 4 and 5 shows the theft prevention device secured behind the vehicle seat 22. As shown in FIG. 6, 7, and 8, the theft prevention device 10 may be secured such that the device is secured forward of the lumbar support member. Specifically, the device 10 is secured to a pivoting bolt 16 of the rocker panel 18 at a position forward of the seat 22. When the theft prevention device is installed in this manner, the device 10 functions in much the same manner as discussed above, except the extension member is shortened when a vehicle owner desires to securely lock his or her vehicle. Specifically, the second bar 34 is telescopically moved within the first U-shaped member 24 until the lumbar support member 20 and the seat member 74 are moved to their forward positions (see FIGS. 7 and 8). When the vehicle seat 22 is moved forward sufficiently to limit access to the passenger compartment (see FIG. 7), the second bar 34 is locked relative to the U-shaped bar 24 by actuating the locking member 52.

The theft prevention device has been disclosed for use with a manual lumbar support member designed to freely rotate relative to the seat member. However, the present theft prevention device may be used with electronically controlled vehicle seats without departing from the spirit of the present invention. In addition, the disclosed locking member requires manual actuation to lock or unlock the extension member. However, the locking member could be electronically controlled, while remaining within the spirit of the present invention. Further, the locking member could be automatically actuated (as opposed to manually actuated), without departing from the spirit of the present invention.

The theft prevention device has been designed for use with all seat types. For example, the device may be used with bucket seats by attaching a device to the driver seat and the passenger seat. Similarly, when the device is secured to a split bench seat, one device is attached to the passenger side of the seat and another device is attached to the driver side of the seat. If the vehicle includes a full bench seat, a single device may be used.

Use of the theft prevention devices creates an environment that protects a vehicle from theft and deters a thief from attempting to steal the vehicle. Specifically, by locking the seat adjacent the front instrument panel and dashboard of the vehicle, the would-be thief is not able to enter the passenger compartment to drive the vehicle or steal other objects contained within the passenger compartment. That is, the locked seat protects the glove compartment, stereo equipment, steering wheel and air bags. In addition, after entering a car the thief will notice the extension bar locking the seat in a forward position. Hopefully, the thief will then consider the futility of entering the vehicle and move on to another vehicle.

While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A theft prevention device used in combination with a vehicle seat and a vehicle frame portion said vehicle seat mounted to and moveable with respect to said vehicle frame portion, the vehicle seat including a seat member and a lumbar support member, comprising:

an extension member having a first end pivotally secured to the frame portion of the vehicle and a second end pivotally secured to the vehicle seat, the extension member being extendable between a first compact length and a second extended length; and locking means coupled to the extension member for selectively locking the extension member at desired lengths;

wherein the extension member is adapted to be locked at desired lengths to lock the vehicle seat in a forward position to thereby prevent a thief from accessing the passenger compartment of the vehicle.

2. The theft prevention device according to claim 1, wherein the extension member includes a first bar coupled to a second bar in a manner permitting the first bar and the second bar to move relative to each other.

3. The theft prevention device according to claim 2, wherein the first bar is telescopically coupled to the second bar.

4. The theft prevention device according to claim 3, wherein the second bar is telescopically received within the first bar.

5. The theft prevention device according to claim 4, wherein the first bar is U-shaped, thereby, creating a recess in which the second bar moves.

6. The theft prevention device according to claim 3, wherein the locking means is mounted on the first bar and selectively engages the second bar to lock the second bar relative to the first bar.

7. A theft prevention device used in combination with a vehicle seat and a vehicle frame portion said vehicle seat being mounted upon said vehicle frame portion, wherein the vehicle seat includes a seat member and a lumbar support member, comprising:

a first bar pivotally secured to the frame portion of the vehicle;

a second bar coupled to the first bar permitting the first bar and the second bar to move relative to each other, the second bar pivotally secured to the vehicle seat; and locking means coupled between the first bar and the second bar for selectively locking the first bar and the second bar relative to each other;

wherein the first bar and the second bar are adapted to be locked relative to each other when the vehicle seat is forwardly positioned to substantially limit the work area in which a thief may access the passenger compartment of the vehicle.

8. The theft prevention device according to claim 7, wherein the second bar is telescopically received within the first bar.

9. The theft prevention device according to claim 8, wherein the locking means is mounted on the first bar and selectively engages the second bar to lock the second bar relative to the first bar.

10. The theft prevention device according to claim 9, wherein the second bar is provided with openings through which the locking means passes to lock the second bar relative to the first bar.

11. The theft prevention device according to claim 8, wherein the first bar is U-shaped, thereby, creating a recess in which the second bar moves.

12. The theft prevention device according to claim 7, wherein the locking means is mounted on the first bar and selectively engages the second bar to lock the second bar relative to the first bar.

13. The theft prevention device according to claim 12, wherein the second bar is provided with openings through which the locking means passes to lock the second bar relative to the first bar.

14. A vehicle provided with a theft prevention device, comprising:

a vehicle seat movable between a first rearward position providing space for a driver to sit within the seat and drive the vehicle and a second forward position limiting access to components associated with a front instrument panel and dashboard of the vehicle;

a theft prevention device which selectively locks the vehicle seat in the second forward position to substantially limit the work area in which a thief may access the passenger compartment of the vehicle, wherein the theft prevention device includes:

an extension member having a first end pivotally secured to a frame portion of the vehicle and a second end pivotally secured to the vehicle seat, the extension member being extendable between a first compact length and a second extended length; and locking means coupled to the extension member for selectively locking the extension member at desired lengths.

15. The vehicle according to claim 14, wherein the extension member includes a first bar secured to the frame member and a second bar secured to the vehicle seat.

16. The vehicle according to claim 15, wherein the extension member includes looking means selectively locking the first bar relative to the second bar.

17. The vehicle according to claim 15, wherein the first bar is secured to a pivoting bolt of a rocker panel of the vehicle.

18. The vehicle according to claim 15, wherein the second bar is secured to a lumbar support member of the vehicle seat.

19. The vehicle according to claim 14, wherein the means for locking includes a locking member.

20. The theft prevention device according to claim 1, wherein the vehicle seat includes means for externally securing the second end of the extension member to the lumbar support member of the vehicle seat.

21. The theft prevention device according to claim 1, wherein the locking means is a spring lock.

22. The theft prevention device according to claim 7, wherein the vehicle seen includes means for externally securing the second bar to the lumbar support member of the vehicle seat.

23. The theft prevention device according to claim 7, wherein the locking means is a spring lock.

24. The vehicle according to claim 14, wherein the second end of the extension member is externally secured to a lumbar support member of the vehicle seat.

25. The vehicle according to claim 16, wherein the locking member is a spring lock.

* * * * *